Figure 8:
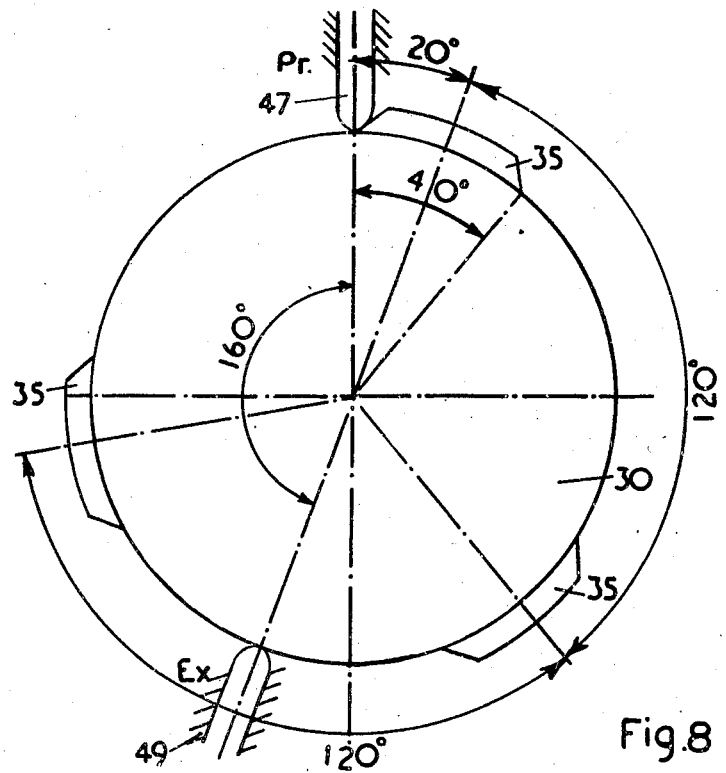

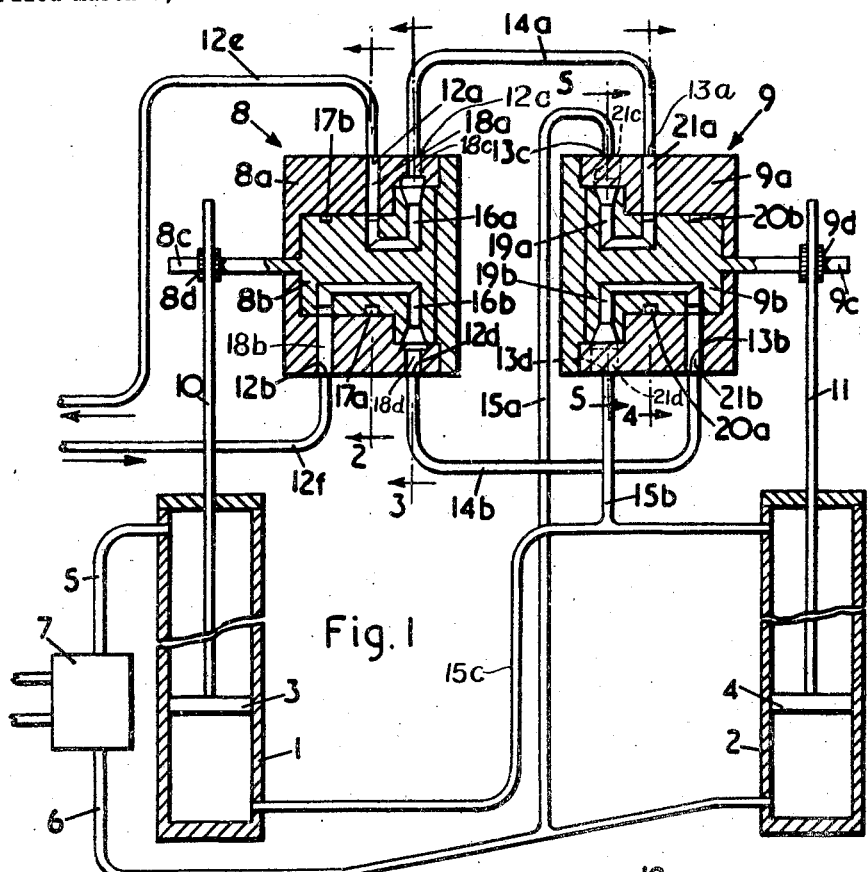

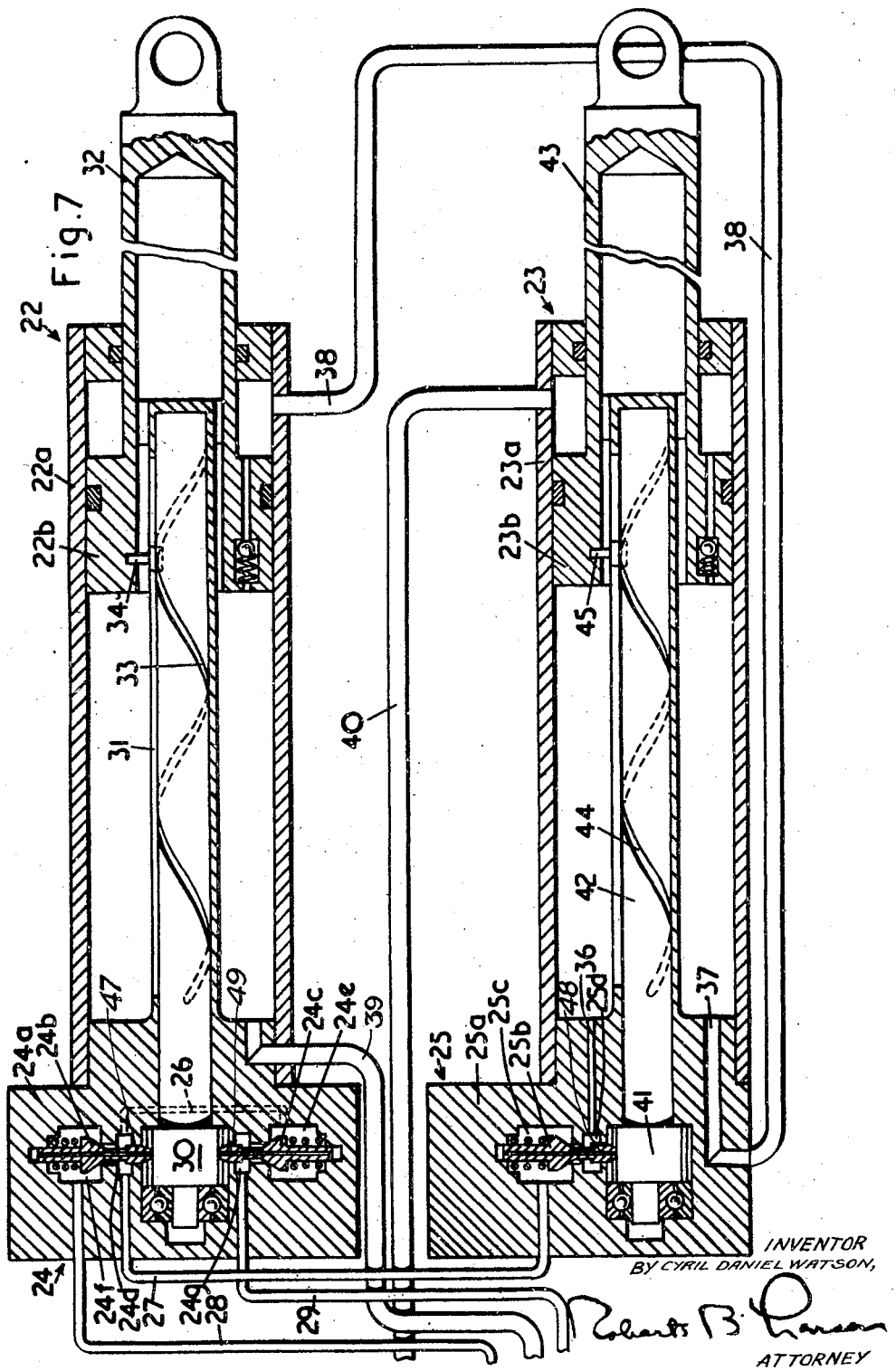

Patented Nov. 8, 1949

2,487,402

UNITED STATES PATENT OFFICE 2,487,402

HYDRAULIC POWER DEVICE HAVING SYNCHRONIZING MEANS

Cyril Daniel Watson, Farnborough, England

Application March 7, 1946, Serial No. 652,532
In Great Britain September 2, 1944

Section 1, Public Law 690, August 8, 1946
Patent expires September 2, 1964

18 Claims. (Cl. 60—97)

This invention relates to improvements in and relating to hydraulic power devices having synchronizing means of the kind comprising two or more hydraulic power elements, such as hydraulic motor elements, which are intended to be operated in synchronism. Such power devices find particular application, for example, in the synchronization of the wing flaps of aircraft. Accurate synchronization between port and starboard flaps is required to preserve lateral trim and to prevent objectional or dangerous rolling movements. Also, if the flaps are made in independent sections, it is desirable that the several sections shall be properly synchronized. This problem arises acutely in the case of folding wing aircraft in which it is much easier to carry a hydraulic hose across a wing folding hinge than to provide a mechanical connection between two flap sections. Moreover, when more than one jack is provided for one flap section, these jacks require to be synchronized to avoid straining the flap in torsion, for which its structure is not normally designed.

One object of the invention, therefore, is to provide in, or for, a hydraulic power device of the above kind, means for automatically correcting any lack of synchronization which may arise in the operation of the device.

Another object is to provide a hydraulic power device of the kind referred to in which each power element operates one or more synchronizing valve units, so arranged that, if the power elements are out of synchronism, intermittent, communication is established, throughout the stroke of the said power element, through appropriate synchronizing valves between an external pressure and/or return line and one or more of the power elements in such a manner as to correct any such lack of synchronization, but as long as all the power elements are in synchronism, no such communication is established.

A further object of the invention is to provide a hydraulic power device of the above kind having synchronizing valve units, one of the units preferably being a master valve communicating with the pressure and return lines whilst the remaining valve or valves constitutes or constitute a slave valve or valves hydraulically connected to the power element or elements which operates it or operate them and also to the master valve.

A still further object is to provide a suitable mechanical connection between the moving members of the hydraulic power elements which may, for example, be hydraulic rams or jacks, and the associated valve units. For example, where rotary valves are employed, rack and pinion gearing may be used.

Or again, in the case where poppet or needle valves are employed, the latter may each, advantageously, be operated by means of a cam carried on a spindle associated with the pertaining power element and adapted to be rotated by movement of the movable member of the power element, motion translating means being interposed between the said member and the associated cam spindle.

Figure 9:
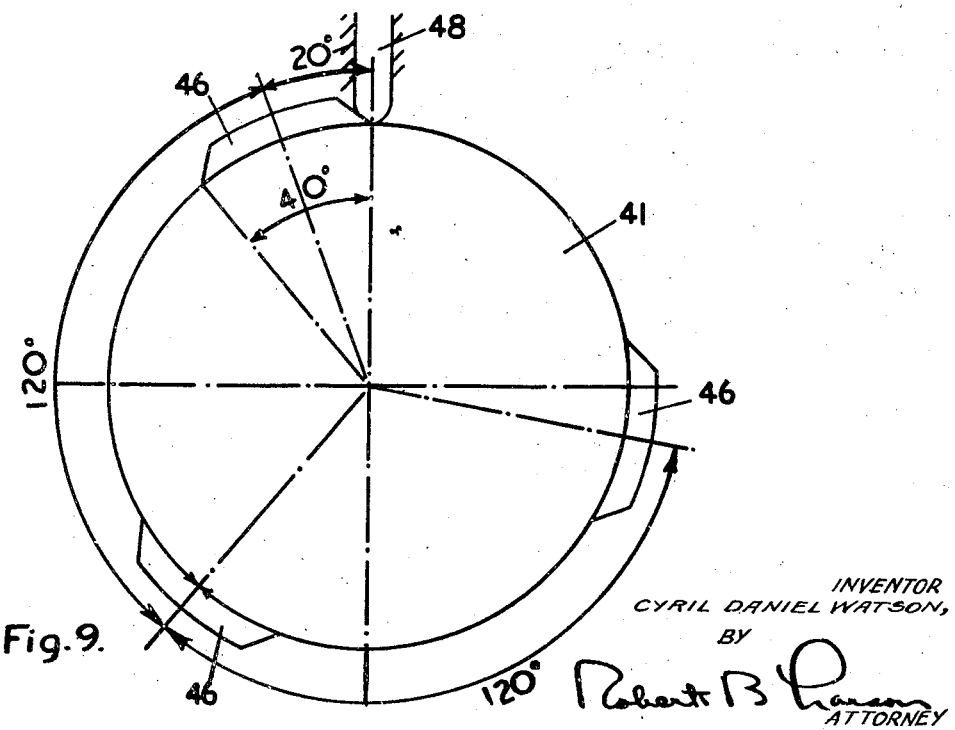

The means by which the above and other objects of the invention are attained will be more readily understood after reference has been made to the accompanying drawings, forming part of this specification, which show by way of example, two forms which the invention may, advantageously, take and in which:

Figure 1 is a diagrammatic sectional side view of a hydraulic power device including a pair of synchronously operated rams and embodying one form of synchronization correcting means in accordance with the invention, Figures 2, 3, 4 and 5, are sections on the lines 2—2, 3—3, 4—4, and 5—5, respectively of Figure 1, Figure 6, is the sectional end view of the slave valve shown in Figure 1 in the operating position thereof, Figure 7, is a similar view to Figure 1 illustrating a second embodiment of the invention in which poppet valves are employed, and Figures 8 and 9, are diagrams showing the relative disposition of the cams used in the embodiment shown in Figure 7 to ensure the proper functioning of the synchronizing mechanism.

Referring first to the embodiment shown in Figure 1, 1 and 2 are two hydraulic jacks or rams having plungers 3 and 4 therein the area of the underside of plunger 3 being equal to the effective area of the upperside of plunger 4 so that the transfer of liquid, from one cylinder to the other, through a series connection 15c, results in equal movements of the two plungers and adapted to be supplied with pressure fluid from a source of supply, not shown, through conduits 5 and 6, a selector valve 7 being provided for controlling the supply to either the ram 1 or the ram 2 as required. The two rams are intended for synchronous operation and synchronism at the commencement of the stroke is assumed in the following description. 8 and 9 represent two rotary valve units comprising a casing 8a and 9a respectively in which rotates a rotor 8b and 9b, On the shaft 8c of the rotor 8b is keyed a pinion 8d with which engages a rack formed on the plunger rod 10 of the plunger 3. Similarly, to the shaft 9c of the rotor 9b is keyed a pinion 9d engaging a rack formed on the plunger rod 11 of the plunger 4.

The valve casing 8a has four external ports 12a, 12b, 12c and 12d therein. The ports 12a and 12b are connected respectively by conduits 12e and 12f to the return and pressure lines respectively of an independent supply source, also not shown. The valve casing 9a is provided with four similar ports 13a, 13b, 13c and 13d (see also Figure 5).

The ports 12c and 12d are connected by conduits 14a and 14b to the ports 13a and 13b respectively and the ports 13c and 13d communicate via conduits 15a and 15b with opposite sides of the ram plunger 4.

The rotor 8b of the valve unit 8 is formed with two internal passages 16a and 16b which communicate with annular grooves 17a and 17b in the rotor, which grooves are in continuous communication with the ports 12a and 12b by means of galleries 18a and 18b formed in the valve casing 8a. The rotor 9b of the valve unit 9 is also formed with two internal passages 19a and 19b which communicate with annular grooves 20a and 20b in the rotor 9b, which grooves are in constant communication, by means of galleries 21a and 21b in the valve casing 9a with the transfer conduits 14a and 14b respectively.

It will thus be seen that the rotation of the rotor 8b by the movement of the plunger 3 of the ram 1 will cause the internal passages 16a and 16b therein to be brought intermittently into communication with the ports 12c and 12d, and, similarly, the rotation of the rotor 9b of the valve unit 9 by the plunger 4 of the ram 2 will bring the internal passages 19a and 19b therein into intermittent communiction with the external ports 13c and 13d.

As clearly shown in Figures 2 to 5, the internal openings of the galleries 21c and 21d are displaced relatively to those of the galleries 18c and 18d, so that when, as in Figure 1, the rams are working in synchronism, no communication is established between the pressure and return lines 12f and 12e respectively, and the ram 2 since the uncovering of the ports 12c and 12d is out of phase with that of the ports 13c and 13d: in this description, the term "uncovering of the ports 12c and 12d" refers to the placing of these ports in communiction with the conduits 12e and 12f respectively, by way of the passages 16a and 16b and the term "uncovering of the ports 13c and 13d" refers to the placing of them in communication with the conduits 14a and 14b respectively, by way of the passages 19a and 19b. If however, the movement of the plunger 4 of the ram 2 becomes out of synchronism with that of the plunger 3 of the ram 1 to the extent necessary to cause the uncovering of the ports 12c and 12d to overlap that of the ports 13c and 13d, communiction is established through the valve unit 8, the transfer lines 14a and 14b the valve unit 9 and the conduits 15a and 15b, between the pressure line 12f and one side of the ram plunger 4 and the return line 12e and the otherside of the said plunger 4.

The pressure and return lines are respectively connected to the appropriate sides of the plunger 4 so as to correct for any lack of synchronism according to whether the ram 4 is leading or lagging. An example of a relative position of the ports in the valve unit 9 when the ram 4 is out of synchronism is shown in Fig. 6.

The relative positions of the valves 8b and 9b after the jacks have been synchronized at the ends of their strokes is as shown in Figures 2 to 5. Since the cylinders are connected in series and movement of one plunger depends on the amount of liquid displaced by the other, then if the effective areas of the plungers in contact with the transfer liquid are equal the movements of the two plungers will be the same, provided no leakage takes place, and no liquid is added or taken away through conduit 15c. Under these conditions synchronism will be maintained throughout the stroke.

With the valves in the relative postions shown in Figures 2 to 5, passage 19a in valve 9b is never open to gallery 21c at the same time as passage 16a in valve 8b is open to gallery 18c. Similarly, passage 19b in valve 9b is never open to gallery 21d, at the same time as passage 16b of valve 8b is open to gallery 18d and no liquid is added or removed through the series conduit 15c.

For outward movement of the plunger rods the valve 9b will appear to rotate in a counter-clockwise direction and valve 8b in a clockwise direction when viewed in the respective directions in which Figures 2 to 6 are drawn. For inward movement of the plungers they will appear to rotate in the opposite directions.

The action of the valves 8b and 9b, when the plungers are out of step, will now be described for several conditions of lack of synchronism it being understood that the plungers were synchronized at the beginning of the stroke in each case.

When the plungers are moving outwards, with plunger 4 slightly ahead, valves 8b and 9b will be in the relative positions shown in Figures 2 and 3 and Figure 6. During part of their rotation, conduit 6 will be connected via gallery 21c, passage 19a, gallery 21a, conduit 14a, gallery 18c, passage 16a, and gallery 18a, to the control return conduit 12e, and the series connection 15c will be connected via gallery 21d, passage 19b, gallery 21b, conduit 14b, gallery 18d, passage 16b, and gallery 18b, to the control supply conduit 12f. Thus, plunger 3 will move ahead relative to plunger 4, and additional liquid will be supplied to the series transfer line 15c to compensate for this relative movement and cause the plungers to operate less out of step. Any lack of synchronism remaining is further corrected when the valves 8b and 9b have rotation through 180° from the positions shown in Figures 2 and 3 and 6, when the external connections described above are re-established between the control conduits 12e and 12f and the cylinders, the connections now being from conduit 15c via conduit 15b, gallery 21d, passage 19a, groove 20a, gallery 21a, conduit 14a, gallery 18c, passage 16b, groove 17b, gallery 18b, to conduit 12f and from conduit 6, via conduit 15a, gallery 21c, passage 19b, groove 20b, passage 21b, conduit 14b, gallery 18d, passage 16a, groove 17a, gallery 18a to conduit 12e. Thus a correction is applied twice for each revolution of the valves until synchronism is re-established.

Now consider the case where the plungers are moving outwards and the plunger 4 is lagging instead of leading. The valve 9b will now be displaced relative to valve 8b, and in Figure 5 will have a clockwise displacement when valve 8b is in the position shown in Figures 2 and 3. Passages 19a and 19b in valve 9b will be connected to galleries 21d and 21c respectively in the valve body 9a and conduit 15a will then be connected to the pressure side 12f of the control system via gallery 21c, passage 19b, gallery 21b, conduit 14b, gallery 18d, passage 16b, and gallery 18b. The conduit 15c which allows the jacks to operate in series, will be connected to the return conduit 12e of the control system via the gallery 21d, passage 19a, gallery 21a, conduit 14a, gallery 18c, passage 16a, gallery 18a. By connecting as viewed in Figure 1 the lower end of cylinder 2 to the control pressure supply and connecting the rod end to the return side of the control system, plunger 4 is moved forward relative to plunger 3, and, the volume of liquid in the ends of the cylinders connected by the series transfer line 15c is reduced to enable the plungers to operate more in synchronism, during the period when no two valves are open simultaneously and the corrective action is thus discontinued. Should complete synchronism not be established, corrective action is again applied when the valves have rotated through half a revolution, when conduit 15a is again connected to the conduit 12f by way of the gallery 21c, passage 19a, groove 20a, gallery 21a, conduit 14a, gallery 18c, passage 16b, groove 17b, and gallery 18b, and conduit 15c is connected to conduit 12e by way of conduit 15b, gallery 21d, passage 19b, groove 20b, gallery 21b, conduit 14b, gallery 18d, passage 16a, groove 17a, and gallery 18a. Thus, corrective action is applied twice for each revolution of the valves until the jacks are in synchronism, when the control system becomes inoperative as long as the series arrangement maintains synchronism.

For inward movement of the plungers, working fluid under pressure will be supplied through conduit 5 and returned through conduit 6, and, the direction of rotation of the valves as seen in the diagrams will be as previously stated.

When plunger 4 is lagging, simultaneous opening of the valves occurs when they are in the positions shown in Figures 2, 3 and 6, when, as previously explained, conduit 6 will be connected to conduit 12e and the series transfer line 15c connected to conduit 12f, thus causing plunger 4 to move forward relative to plunger 3 and introducing liquid into the series transfer line, the operation being repeated at each half revolution of the valves until synchronism is re-established when the jacks will operate synchronously due to the series arrangement of the cylinders.

When the plungers are moving inwards, with plunger 4 leading, valve 9b will be displaced relative to valve 8b and when the latter is in the position shown in Figures 2 and 3 valve 9b will be displaced clockwise from the position shown in Figure 5. Thus, passage 19a will be connected to gallery 21d and passage 19b connected to gallery 21c and conduit 15c connected to the control system return conduit 12e, and conduit 15a, will be connected to the control system pressure conduit 12f. The movement of plunger 4 is thus retarded, and the volume of the series transfer liquid adjusted to allow the jacks to operate more in step until synchronism is finally achieved by repeated applications of control fluid, which occur twice for each revolution of the valves.

Referring now to the embodiment shown in Figure 7, 22 and 23 represent two jacks comprising respectively a cylinder 22a having therein a plunger 22b and a cylinder 23a having therein a plunger 23b, the effective areas of the plungers in contact with the series transfer liquid being the same, so that equal displacements of the plungers result from the transfer of liquid between the series connected ends of the cylinders.

With the jack 22 is associated a valve unit 24 corresponding to the valve unit 8 of Figure 1, and with jack 23 is associated a valve unit 25 corresponding to the valve unit 9 of Figure 1.

Referring first to the valve unit 24 and its mode of operation, within the casing 24a are housed two spring loaded poppet valves 24b and 24c. By a gallery 26 the underside 24d of the valve 24b is connected to the upper side 24e of the valve 24c, which gallery communicates freely via a transfer line or conduit 27 with the valve unit 25. The upper side 24f of the valve 24b connects with an external pressure line 28 and the underside 24g of the valve 24c communicates with the return line 29.

The valves 24b and 24c are operated by means of a cam-plate 30 mounted adjacent one end of a spindle 31 extending within the casing 24a and carried co-axially within the plunger rod 32 of the plunger 22b. On the said spindle is formed a course pitch thread 33 in which engages a nut 34 carried by, and projecting inwardly of, the plunger 22b. The cam-plate 30 is formed with three cam surfaces 35 (see Figure 8). Referring now to the lower half of Figure 7, the valve unit 25 comprises a casing 25a having therein a single spring loaded poppet valve 25b, the upper side 25c of which communicates with the aforesaid transfer line 27. The underside 25d of the said valve is in communication via a bore 36 with the left hand end of the cylinder 23a of the jack 23, which cylinder also communicates via a bore 37 and a transfer line 38 with the right hand end of the cylinder 22a of the jack 22. The left hand end of the jack cylinder 22a is connected to an external power line 39 and the right hand end of the jack cylinder 23a is connected to a second external power line 40, which lines are reversibly connected to "pressure" and "return" through a selector valve (not shown in the drawings) which in its central position blocks both external power lines 39 and 40, thus locking the motors against movement.

The valve 25b is operated by a cam-plate 41 mounted on one end of a spindle 42 extending within the casing 25a and carried co-axially within the plunger rod 43 of the plunger 23b. On the spindle 42 is formed a coarse pitch thread 44 with which engages a nut 45 depending within the plunger 23b to cause rotation of the said camplate 41 by movement of the ram plunger 23b. The cam-plate 41 is also formed with three cam surfaces 46 (see Figure 9). The two threads 33 and 44 are each of such a pitch that the two cam-plates 30 and 41 are rotated at the same speed.

The cam profiles and the phasing of the two cam-plates 30 and 41 relatively to the valve tappets operated thereby are so selected that, so long as the jack plungers are moving in synchronism, the three valves 24b, 24c and 25b are opened one at a time, there being no overlap of valve openings and no substantially "dead" intervals in which all the valves are closed. Consequently, since the valve 25b of the valve unit 25 can only be connected to the pressure and return lines 28 and 29 through the valves 24b and 24c respectively, there will be no application of pressure or relief to the jack 23 so long as the two jacks 22 and 23 are operating in synchronism. If, however, de-synchronization takes place, the cam-plates 30 and 41 also get out of step with the result that the opening of the valve 25b overlaps the opening of the valve 24b or the valve 24c as the case may be, in which case the series-connected end of the jack cylinder 23a is put into communication with either the pressure or returne line 28 or 29 and a correction is applied.

In order that the correction may be of the appropriate sign to restore synchronism (and not to aggravate the lack of it) the phasing of the cam-plates 30 and 41 must be appropriate to their direction of rotation relative to the direction or motion of the jack plungers 22b and 23b having regard also to which end of the jack 23 communicates with valve 25c.

The required operation may be obtained by providing the cam-plates 30 and 41 each with three cams 35 and 46 as above described and as shown in Figures 8 and 9. The three cams 35 or 46 are spaced 120° apart, the dwell of each cam subtending an angle of 40° (or slightly less), and the cam plate 41 being 40° out of phase with the cam-plate 30, the respective datum points being defined by the tappets 47 and 48 of the valves 24b and 25b whilst the tappet 49 of the valve 24c is displaced 40°, 160°, or 280° from that of the valve 24b, in the body of valve unit 24, in the same direction as the cam-plate 41 of the valve unit 25 is displaced from that of the valve unit 24.

This arrangement gives three complete valve cycles per revolution of the cam-plates 30 and 41, and, therefore provides 3N "checking points" in the complete stroke of the jack plungers 22b and 23b, N being the number of revolutions executed by the said cam-plates 30 and 41 in the complete stroke. N may be a whole number or fractional and may be selected in accordance with the accuracy of synchronization aimed at, it being clear that the more numerous the checking points, the more accurate will be the synchronization.

As will be seen from the arrangement shown in Figure 7, a very compact structure is provided by incorporating the valve units 24 and 25 in the jack units.

The method of re-establishing synchronism, when the jacks are out of step, is described below. Referring to Figures 7, 8 and 9, the cam plates 30 and 46 are drawn looking in a direction from the outer to the inner ends of the cylinders, and will appear in the diagrams to rotate in a clockwise direction for inward movement of the plungers and in a counter-clockwise direction for outward movement.

In the positions shown in Figures 8 and 9 it will be seen that if the relative positions of the cam plates remain unchanged during movement of the plungers, then any two of the valves 24b, 25b, and 24c are never open simultaneously and no control liquid can be introduced or removed from the system through the series transfer line conduit 38 connecting the cylinders. If the jacks have been synchronized at the ends of their strokes and the effective areas of the plungers in contact with the liquid in the portions of the cylinders connected in series, are equal, that is, if the difference in the cross-sectional areas of cylinder 22a and the exterior of rod 32 is equal to that of cylinder 23a, then synchronous operation of the jacks will result so long as no leakage of the transfer liquid takes place. If, however, the jacks become out of step, the action of the valves to restore synchronous movement is described below.

Considering the case when the plungers are moving outwards with plunger 23b lagging, working fluid will be supplied through conduit 39 and returned through conduit 40, and the cam plates in Figures 8 and 9 will revolve counter-clockwise and owing to the lag of plunger 23b, the cam plate 41 will be displaced relative to cam plate 30. Applying the displacement in a clockwise direction to the cam plate 41 as drawn in Figure 9, it will be seen that valve 24b which is operated by tappet 47 will be open for a short time when valve 25b is opened by tappet 48. Simultaneous opening occurs three times for each revolution of the cam plates and the duration of the opening depends on how far plunger 23b is lagging. Further, in no other position during next one third of a revolution of the cam plates, for a reasonable relative displacement of the latter, are any two of the valves 24b, 24c, 25b, open simultaneously, which is a necessary condition for the control fluid to operate. When the valve 24b and 25b are both open liquid under pressure from the control system is forced into the inner end of cylinder 23a from conduit 28 via valve 24b, conduit 27, valve 25b and passage 36, the outer end of the cylinder being connected to the return line 40 of the working fluid. The plunger 23b is thus moved forward relative the plunger 22b to correct the lack of synchronism and further correction is applied, if necessary, at each one third of a revolution of the cam plates until complete synchronism is established when the jacks will operate in series until it is necessary to again apply a correction.

When the rams are moving outwards with plunger 23b leading, cam plate 41 will be displaced counter-clockwise relative to cam plate 30 in Figures 8 and 9 and the sequence of valve openings will be as follows, since, as seen in the diagrams the cam plates are revolving in a counter-clockwise direction. Valve 24b operated by tappet 47 will open and close and during this period valve 24c, operated by tappet 49, and valve 25b, operated by tappet 48, will remain closed, then valve 24c will be opened by the cam 35 on the left of Figure 8 but, during the end of the period of opening, valve 25b will be opened by the cam 46 on the right of Figure 9.

The time during which they are open together will depend on the relative displacement of the cam plates. Since at no other time are two valves open simultaneously this is the only correction applied when plunger 23b is leading and operates by connecting the inner end of cylinder 23a to the return conduit 29 of the control system by way of passages 36, valve 25b, conduit 27, passage 26, valve 24c, and recess 24g, resulting in the forward movement of plunger 23b being arrested and the volume of liquid, for correct series operation of the jacks, being adjusted. As explained previously, the correction is applied three times for each revolution of the cam plates until the jacks are operating in synchronism.

Now consider the case of inward moving jacks. The supply and return conduits of the working fluid will be 40 and 39 respectively and the cam plates will rotate in a clockwise direction as seen in Figures 8 and 9. When plunger 23b is leading cam plate 41 will be displaced clockwise relative to cam plate 30 in Figures 8 and 9 with a result that valves 24b and 25b will open simultaneously and as explained previously, the inner end of cylinder 23a will be connected to the pressure side 28 of the control system thus enabling plunger 22b to move inward relative to plunger 23b due to the increased pressure applied to the inner side of plunger 23b and the outer side of plunger 22b. Also, the volume of liquid in the series connected cylinder ends will be increased to enable the jacks to operate more in step, when they are operating in series only, until further applications of the control liquid produces synchronism.

When the jacks are moving inward and plunger 23b is lagging cam plate 41 in Figure 9 will be displaced counter-clockwise relative to cam plate 30 in Figure 8 and the direction of rotation will be clockwise. Cam 46 at the top of Figure 9 will open valve 25b and, before it closes, cam 35 at the bottom right hand side of Figure 8 will open valve 24c due to the relative displacement of the cam plates. As previously explained, the simultaneous opening of valve 25b and 24c puts the inner end of cylinder 23a in communication with the return conduit 29 of the control system, with the result that plunger 23b can move inwards relative plunger 22b, and reduce the volume in the series connected cylinder ends to enable the jacks to operate more in step until a further correction is applied, if necessary. As explained previously, adjustment takes place three times for each revolution of the cam plate until the jacks are moving in synchronism.

Whilst the invention has been described above as applied to two synchronously operating jacks or rams, suitable for example, for synchronizing the wing flaps of aircraft, it will be appreciated that it is not in any way limited to such an application but may be applied to any hydraulic power system embodying twin or multiple positive displacement power elements required to work synchronously. Moreover, various modifications, which will be apparent to those skilled in the art, may be made therein without departing from the scope of the invention as defined in the appended claims. For example, it is not intended that the invention shall be limited to hydraulic systems in which both or all the power elements are motor elements operated by hydraulic power, but that it shall be applied to systems in which a positive displacement pump element is required to drive synchronously one or more motor elements, or to complex systems embodying more than two synchronous elements and including both pump and motor elements.

I claim:

1. A hydraulic power device of the kind referred to comprising in combination: at least two hydraulic power elements connected together for operation in synchronism; at least one synchronizing valve unit associated with each of said power elements; power transmission means operatively connecting each of said valve units to its pertaining power element, hydraulic connections between at least one of the said valve units and first pressure and return lines associated with a source of hydraulic supply, hydraulic connections, independent of said valve units, to said hydraulic power elements, means independent of said valve units for selectively connecting said connections to second pressure and return lines associated with a source of hydraulic supply, and hydraulic connections between said valve units and said power elements and between one another such that, if the power elements are out of synchronism intermittent communication is established, throughout the stroke of the said power elements, through the appropriate synchronizing valve units between the said first pressure and return lines selectively and at least one of the power elements in such a manner as to correct any such lack of synchronization, but, as long as all the power elements are in synchronism no such connection is established.

2. A hydraulic power device of the kind referred to comprising in combination: a pair of hydraulic power elements connected together for operation in synchronism; a master synchronizing valve associated with one of the said power elements and arranged for connection to first pressure and return lines associated with a source of hydraulic supply; power transmission means operatively connecting said master synchronizing valve to said associated power element, a second synchronizing valve associated with said second power element, power transmission means operatively connecting said second synchronizing valve to said second power element, hydraulic connections, independent of said synchronizing valves, to said hydraulic power elements, means independent of said synchronizing valves for selectively connecting said connections to second pressure and return lines associated with a source of hydraulic supply, and hydraulic connections between said second and master valves and between said second valve and said second power element, the arrangement being such that, if the power elements are out of synchronism intermittent communication is established, throughout the stroke of the said power elements, through the said synchronizing valves, between the said first pressure and return lines selectively and said second power element in such a manner as to correct any such lack of synchronization, but, as long as said power elements are in synchronism, no such connection is established.

3. A hydraulic power device of the kind referred to comprising in combination: at least two hydraulic power elements connected together for operation in synchronism; at least one rotary valve associated with each of said power elements, hydraulic connections between at least one of said valves and first pressure and return lines associated with a source of hydraulic supply, power transmission means operatively connecting each of said valves to its pertaining power element second hydraulic connections, independent of said valves, to said hydraulic power elements, means independent of said valves for selectively connecting said second connections to second pressure and return lines associated with a source of hydraulic supply, and hydraulic connections between said valves and said power elements and between one another such that, if the power elements are out of synchronism intermittent communication is established, throughout the stroke of the said power elements, through the appropriate synchronizing valves between the said first pressure and return lines selectively and at least one of the power elements, in such a manner as to correct any such lack of synchronization, but, as long as all the power elements are in synchronism, no such connection is established.

4. A hydraulic power device of the kind referred to comprising in combination: at least two hydraulic power elements connected together for operation in synchronism: at least one poppet type valve unit associated with each of said power elements, hydraulic connections between one of said valve units and pressure and return lines associated with a source of hydraulic supply, power transmission means operatively connecting each of said valve units to its pertaining power element and hydraulic connections between said valve units and said power elements and between one another such that, if the power elements are out of synchronism intermittent communication is established throughout the stroke of the said power elements through the appropriate synchronizing valve units between the pressure line and the return line selectively and at least one of the power elements, in such a manner as to correct any such lack of synchronization, but, as long as all the power elements are in synchronism, no such connection is established.

5. A hydraulic power device of the kind referred to comprising in combination: at least two hydraulic power elements connected together for operation in synchronism; at least one synchronizing valve unit operatively associated with each of said power elements, hydraulic connections between at least one of said valve units and pressure and return lines associated with a source of hydraulic supply, power transmission means operatively connecting each of said valve units to its pertaining power element, and hydraulic connections between said valve units and said power elements and between one another, valves of said valve units normally being out of phase with one another when said power elements are operating in synchronism whereby, if the power elements are out of synchronism, intermittent communication is established, throughout the stroke of the said power elements, through the appropriate synchronizing valve units, between the pressure line and the return line selectively and at least one of the power elements in such a manner as to correct any such lack of synchronization, but, as long as all the power elements are in synchronism, no such connection is established.

6. A hydraulic power device of the kind referred to comprising in combination: at least two hydraulic power elements connected together for operation in synchronism; at least one synchronizing valve unit associated with each of said power elements; a rack and pinion gearing operatively connecting each valve unit to its pertaining power element, and at least one of said valve units being arranged for connection to first pressure and return lines associated with a source of hydraulic supply, hydraulic connections, independent of said valve units, to said hydraulic power elements, means independent of said valve units for selectively connecting said connections to second pressure and return lines associated with a source of hydraulic supply, and hydraulic connections between said valve units and said power elements and between one another such that, if the power elements are out of synchronism, intermittent communication is established, throughout the stroke of the said power elements, through the appropriate synchronizing valve units, between the said first pressure and return lines selectively and at least one of the power elements, in such a manner as to correct any such lack of synchronization, but, as long as all the power elements are in synchronism, no such connection is established.

7. A hydraulic power device of the kind referred to comprising in combination: at least two hydraulic power elements connected together for operation in synchronism; at least one synchronizing valve unit associated with each of said power elements; a cam device associated with each of said valve units; means, operable on actuation of the pertaining power element, associated with said cam and said power element for rotating said cam, at least one of said valve units being arranged for connection to pressure and return lines associated with a source of hydraulic supply and connections between said valve units and said power elements and between one another whereby, if the power elements are out of synchronism intermittent communication is established, throughout the stroke of the said power elements, through the appropriate synchronizing valve units, between the pressure line and the return line selectively and at least one of the power elements in such a manner as to correct any such lack of synchronization, but, as long as all the power elements are in synchronism, no such connection is established.

8. A hydraulic power device of the kind referred to comprising in combination: at least two hydraulic power elements connected together for operation in synchronism; at least one rotary valve unit associated with each of said power elements, each valve unit comprising a valve body and a rotor therein; gearing between the rotor of each valve unit and its pertaining power element operative on actuation of said power element to rotate said rotor, and said valve body and rotor having ports therein, the number of said ports depending on the velocity ratio of said gearing and at least one of said valve units being arranged for connection to first pressure and return lines associated with a source of hydraulic supply, hydraulic connections, independent of said valve units, to said hydraulic power elements, means independent of said valve units for selectively connecting said connections to second pressure and return lines associated with a source of hydraulic supply, and hydraulic connections between said valve units and said power elements and between one another such that, if the power elements are out of synchronism, intermittent communication is established, throughout the stroke of the said power elements, through the appropriate synchronizing valve units, between the said first pressure and return lines selectively and at least one of the power elements in such a manner as to correct any such lack of synchronization, but, as long as all the power elements are in synchronism, no such connection is established.

9. A hydraulic power device of the kind referred to comprising in combination: a plurality of hydraulic power elements connected together for operation in synchronism; a master synchronizing valve operatively associated with one of said power elements, said valve being arranged for connection to pressure and return lines associated with a source of hydraulic supply; a slave valve operatively associated with each of said other power elements; hydraulic connections between said master valve and each of said last mentioned valves and between the latter and the power elements associated therewith, the arrangement being such that, if the power elements are out of synchronism, intermittent communication is established, throughout the stroke of the said power elements, through said master valve and at least one of said slave valves, between the pressure line and the return line selectively and at least one of the power elements in such a manner as to correct any such lack of synchronization, but, as long as all the power elements are in synchronism no such connection is established.

10. A hydraulic power device of the kind referred to comprising in combination: a plurality of hydraulic power elements connected together for operation in synchronism; a master synchronizing valve operatively associated with one of said power elements, said valve being arranged for connection to pressure and return lines associated with a source of hydraulic supply; a slave valve operatively associated with each of said other power elements; hydraulic connections between said master valve and each of said slave valves and between the latter and the power elements associated therewith, the said valves being normally out of phase with one another when said power elements are in synchronism whereby, if the power elements are out of synchronism intermittent communication is established, throughout the stroke of the said power elements, through said master valve and at least one of said slave valves between the pressure line and the return line selectively and at least one of the power elements in such manner as to correct any such lack of synchronization, but as long as all the power elements are in synchronism, no such connection is established.

11. A hydraulic power device of the kind referred to comprising in combination: a pair of hydraulic power elements connected together for operation in synchronism; a master rotary valve unit associated with one of said power elements, said valve units being arranged for connection to pressure and return lines associated with a source of hydraulic supply; a rotary slave valve unit associated with said other power element, said master and slave valve units each comprising a valve body having four external ports therein and a rotor having two internal passages; means connecting two of the external ports of said master valve units to said pressure and return lines respectively; means connecting said other two external ports in said master valve units to the two corresponding ports in said slave valve units; means connecting the other two external ports of said slave valve units to opposite ends of said second power element and said valve rotors having annular grooves therein communicating with said internal passages therein and said passages being in constant communication with the two first mentioned ports in said master and slave valve units and in intermittent communication with said other ports substantially as and for the purpose specified.

12. A hydraulic power device of the kind referred to comprising in combination: a plurality of hydraulic power elements; a rotary master valve associated with one of said power elements said valve being arranged for connection to pressure and return lines associated with a source of hydraulic supply; a rotary slave valve associated with each of said other power elements; each of said valves comprising a valve body having four external ports therein and a rotor having two internal passages; means for connecting two of the external ports of said master valve to said pressure and return lines respectively; means connecting said other two external ports in said master valve to the two corresponding ports in said valve; means connecting the other two external ports of said slave valve to opposite ends of said second power element and said valve rotors having annular grooves therein communicating with said internal passages therein and said passages being in constant communication with the two first mentioned ports in said master and slave valves and in intermittent communication with said other ports substantially as, and for the purpose, specified.

13. A hydraulic power device of the kind referred to comprising in combination: at least two hydraulic power elements connected together for operation in synchronism; at least one synchronizing valve associated with each of said power elements and each power element including an axially displaceable member; and at least one of said valves being arranged for connection to pressure and return lines associated with a source of hydraulic supply; a rotatable spindle located in each power element; a cam device on said spindle, said cam device being operatively associated with the pertaining valve; motion translating means between said member and said spindle operative to cause rotation of said spindle and said cam on displacement of said member; hydraulic connections between said valves and said power elements and between one another the arrangement being such that, if the power elements are out of synchronism, intermittent communication is established throughout the stroke of the said power elements, through the appropriate synchronizing valves between the pressure line and the return line selectively and one or more of the power elements in such a manner as to correct any such lack of synchronization but, as long as all the power elements are in synchronism no such connection is established.

14. A hydraulic power device of the kind referred to comprising in combination: a pair of hydraulic power elements connected together for operation in synchronism; a rotary synchronizing valve associated with one of said power elements said valve being arranged for connection to pressure and return lines associated with a source of hydraulic supply; a second rotary valve associated with the other of said power elements; each of said valves comprising a valve body and a rotary therein; gearing between the rotor of each valve and its pertaining power element operative, on movement of said power element, to rotate said rotor, and said valve body having four external ports therein and said rotor having two internal passages and two annular grooves therein, two of said external ports of said first mentioned valve being connected to said pressure and return lines respectively and the other two ports communicating with the two corresponding ports of said second valve, the other two external ports of which are connected to opposite ends of said second power element; and said internal passages in each valve communicating with said annular grooves in said valve and also constantly with said two first mentioned ports therein and intermittently with said other ports, and said valves being normally out of phase with one another when said power elements are in synchronism, whereby, if the power elements are out of synchronism, intermittent communication is established, throughout the stroke of the said power elements, through said synchronizing valves between the pressure line and the return line selectively and said second power element in such a manner as to correct any such lack of synchronization, but, as long as said power elements are in synchronism no such connection is established.

15. A hydraulic power device of the kind referred to comprising in combination: a plurality of hydraulic power elements; a master rotary valve associated with one of the said power elements, said valve being arranged for connection to pressure and return lines associated with a source of hydraulic supply; a rotary slave valve associated with each of said other power elements; each of said valves comprising a valve body and a rotor therein; gearing between the rotor of each valve and its pertaining power element operative, on movement of said power element, to rotate said rotor, said valve body having four external ports therein and said rotor having two internal passages and two annular grooves therein, two of said ports in said master valve body being connected to said pressure and return lines respectively and the other two ports communicating with the two corresponding ports of each of said slave valve bodies, the other two external ports of each slave valve body being connected to opposite ends of the associated power element and said internal passages communicating with said annular grooves in said valve rotor and also constantly with said two first mentioned ports and intermittently with said other ports, and said valves being normally out of phase with one another when said power elements are in synchronism, whereby, if the power elements are out of synchronism, intermittent communication is established, throughout the stroke of the said power elements, through the said master valve and at least one of said slave valves, between the pressure line and the return line selectively and one or more of the power elements in such a manner as to correct any such lack of synchronization, but, as long as all the power elements are in synchronism, no such connection is established.

16. A hydraulic power device of the kind referred to comprising in combination: a pair of hydraulic power elements each having an axially displaceable member therein; a master valve unit associated with one of the said power elements, said valve unit having a pair of poppet type valves therein, said valve unit being arranged for connection to pressure and return lines associated with a source of hydraulic supply and said valve units being hydraulically interconnected; a slave valve unit associated with said other power element, said unit having a single poppet valve therein communicating with one of said valves in said master valve unit and with the interior of said power element; a cam device associated with each of said valve units operable to actuate the poppet valves therein; means associated with the displaceable member of the pertaining power element for causing rotation of said cam and movement of said displaceable member, the faces of said cams being normally out of phase with one another when said power elements are operating in synchronism whereby, as long as said power elements are in synchronism the two poppet valves in said master valve unit and the poppet valve in said slave valve unit are opened one at a time, but on said power elements becoming de-synchronized, the opening of said poppet valve in said slave valve unit overlaps the opening of one of said poppet valves in said master valve unit, thereby putting said second power element in communication with the pressure and return line selectively for the purpose specified.

17. A hydraulic power device of the kind referred to comprising in combination: at least two hydraulic power elements connected together for operation in synchonism; at least one synchronizing valve associated with each of said power elements and each power element including an axially displaceable member and at least one of said valves being arranged for connection to pressure and return lines associated with a source of hydraulic supply; a rotatable threaded spindle located in each power element; a cam device on said spindle; a nut on said displaceable member engaging said threaded spindle whereby, on displacement of said member, said spindle is rotated to rotate said cam and said cams being normally out of phase with one another when said power elements are operating synchronously; and hydraulic connections between said valves and said power elements and between one another the arrangement being such that, if the power elements are out of synchronism, intermittent communication is established throughout the stroke of the said power elements through the appropriate synchronizing valves between the pressure line and the return line selectively and one or more of the power elements, in such a manner as to correct any such lack of synchronization, but, as long as all the power elements are in synchronism, no such connection is established.

18. A hydraulic power device according to claim 16 wherein each of said cam devices includes three cam faces spaced apart 120°, the dwell of each cam subtending an angle of substantially 40° and the said cam device associated with said slave valve unit being 40° out of phase with that of said master valve unit.

CYRIL DANIEL WATSON.

REFERENCES CITED

The following references are of record in the file of this patent:

UNITED STATES PATENTS

| Number | Name | Date |
|---|---|---|
| 2,292,278 | Lorenz | Aug. 4, 1942 |
| 2,376,320 | Butrovich et al | May 22, 1945 |
| 2,378,497 | Phillips | June 19, 1945 |
| 2,380,973 | Kopp | Aug. 7, 1945 |